J. BISESI.
TROLLEY WHEEL MOUNTING.
APPLICATION FILED APR. 13, 1914.
1,109,104.
Patented Sept. 1, 1914.
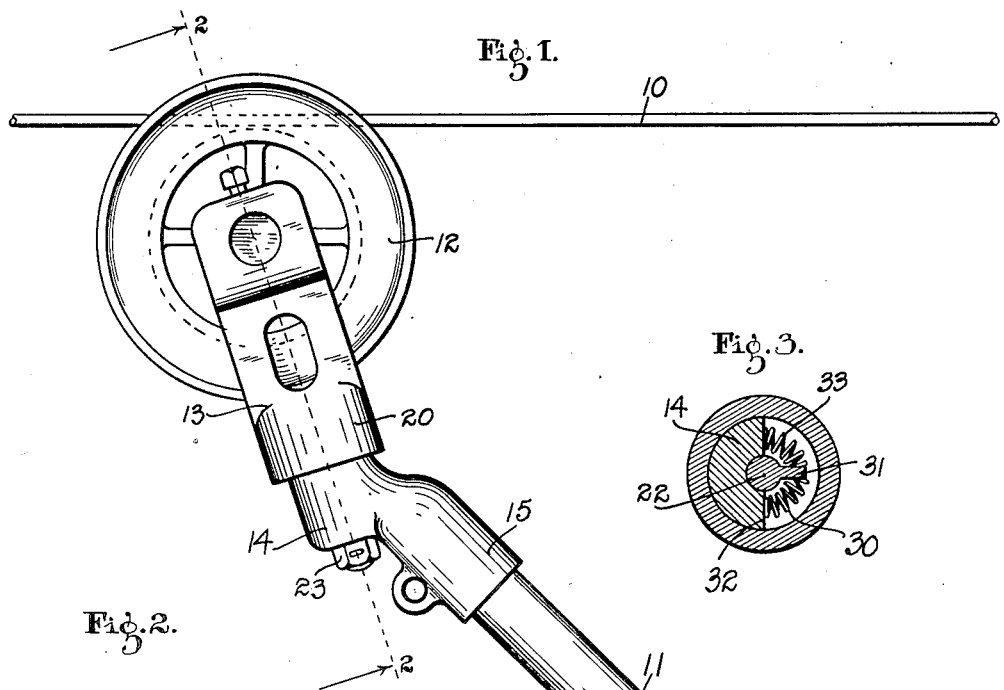
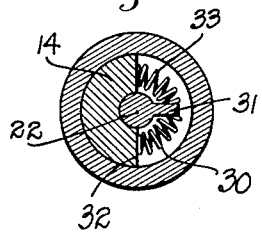
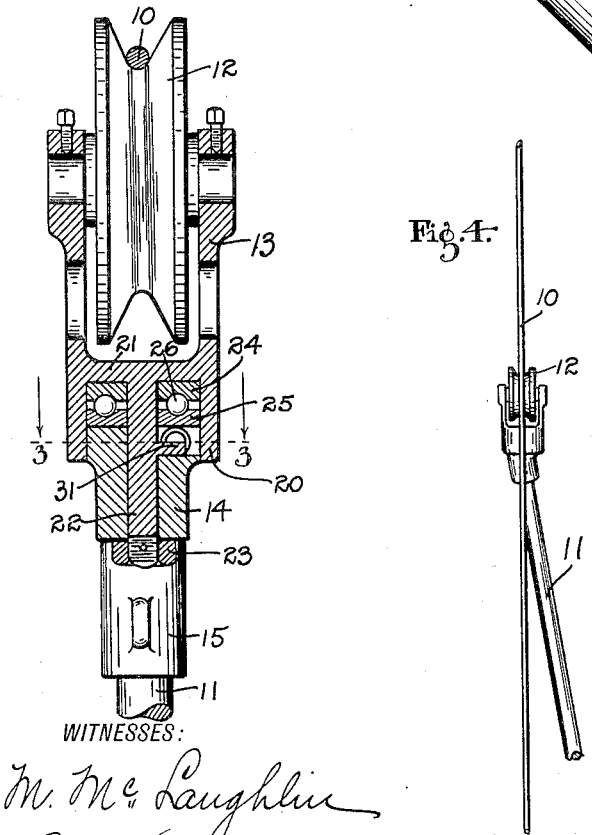
WITNESSES:
O. M. McLaughlin
A. H. Edgerton
INVENTOR
JOSEPH BISESI
BY
V. H. Lockwood
ATTORNEY

UNITED STATES PATENT OFFICE.

JOSEPH BISESI, OF MARTINSVILLE, INDIANA.

TROLLEY-WHEEL MOUNTING.

1,109,104. Specification of Letters Patent. Patented Sept. 1, 1914.

Application filed April 13, 1914. Serial No. 831,636.

*To all whom it may concern:*

Be it known that I, JOSEPH BISESI, a citizen of the United States, and a resident of Martinsville, county of Morgan, and State of Indiana, have invented a certain new and useful Trolley-Wheel Mounting; and I do hereby declare that the following is a full, clear, and exact description thereof, reference being had to the accompanying drawings, in which like letters refer to like parts.

The object of this invention is the mounting of trolley wheels so that the same will not escape from the trolley wire while the car is making turns.

The chief feature of the invention consists in mounting the trolley wheel on a trolley pole with a covered and thoroughly protected spring-controlled bearing, which will permit oscillatory movement in either direction independently of the trolley pole, and which will automatically return to normal position upon opportunity. With such arrangement the trolley wheel will always travel straight with and against the trolley wire, instead of attaining a twisted position with reference to the trolley wire, whereby the trolley wheel is caused to escape from the wire while the car is turning a corner.

The nature of the invention will be understood from the accompanying drawings and the following description and claim.

In the drawings, Figure 1 is a side elevation of a section of a trolley wire and of the upper portion of a trolley pole with a trolley wheel mounted thereon and in operating position with relation to the wire. Fig. 2 is a section on the line 2—2 of Fig. 1. Fig. 3 is a section on the line 3—3 of Fig. 2. Fig. 4 is a plan view of what appears in Fig. 1 with the trolley pole in position while the car is turning a corner, the trolley wheel being mounted according to this invention. Fig. 5 is the same with the trolley wheel mounted as heretofore.

There is shown in the drawings herein a trolley wire 10 and a trolley pole 11, which may be mounted in the usual fashion.

12 is the trolley wheel, 13 the trolley wheel housing, and 14 the bearing or support for the trolley wheel housing. The part 14 has a portion 15, which is clamped on the upper end of the trolley pole. The portion 15 extends at an angle away from the bearing 14, as shown in Fig. 2, so that the axis of the bearing 14 will lie behind and away from the part 15 secured to the trolley pole, and the bearing 14 is more nearly vertical than the trolley pole or part 15.

The housing 13 has a lower and truly cylindrical portion 20, which is in the nature of a sleeve, and a plate 21 closes the upper end of said sleeve, as shown in Fig. 2, and a bearing pin 22 extends down from the plate 21 centrally of said sleeve 20 and centrally through the bearing 14, and it is secured in place at its lower end by a nut 23 so as to prevent escape but not prevent oscillatory movement of the housing 13 on the bearing 14. A ball bearing is provided between said members 13 and 14, consisting of the upper plate 24 and lower plate 25, with a ball race occupied by balls 26. These plates 24 and 25 lie within the upper end of the sleeve 20 and surrounding the pin 22.

With the foregoing arrangement free oscillatory movement of the trolley wheel housing is permitted, but to cause a return of the trolley wheel to normal position, the spring construction shown in Fig. 3 is provided. The upper end of the bearing 14 has a semi-circular recess 30 in it, into which an arm 31 from the pivot rod 22 extends, so that as said pivot rod 22 oscillates, the arm 31 will likewise oscillate laterally. Between each side of said arm 31 and the vertical walls 32 of the upper end of the bearing 14, there is located a spiral spring 33. The springs counteract each other so as to return the arm 31 on the pivot 22 to normal position, as shown in Fig. 3, after any deviation from that normal position. Said spring should be relatively weak, so that as it is compressed by the turning movement of the trolley pole when the car turns a corner, it will not prevent, but will, on the other hand, permit the trolley wheel to run straight with the trolley wire, as shown in Figs. 1 and 2, regardless of the position of the trolley pole and car.

It is seen that with this construction the trolley wheel will tend to run straight with the trolley wire and not escape therefrom while a car is turning a corner, and both the bearing and the springs are inclosed and wholly protected by the sleeve 20 from escape and from the weather and dust, and thereby a compact and durable construction is provided.

The invention claimed is:

A trolley wheel construction including a trolley pole, a cylindrical bearing member on the upper end thereof having a semi-circular recess in its upper end, a trolley wheel housing with a cylindrical recess in its lower end surrounding the upper part of said bearing member and having also a pivot pin extending centrally through said bearing member, an arm projecting radially from said pivot pin into said recess in the bearing member, and a spring on each side of said arm and lying between said arm and the vertical walls at the upper end of said bearing member for returning said housing to its normal position after oscillation.

In witness whereof, I have hereunto affixed my signature in the presence of the witnesses herein named.

JOSEPH BISESI.

Witnesses:
J. H. WELLS,
O. M. McLAUGHLIN.